Aug. 6, 1957 — R. S. NASLUND — 2,801,866
AUTOMOBILE SAFETY BAR DEVICE
Filed Dec. 20, 1954 — 2 Sheets-Sheet 1

INVENTOR.
Rubert S. Naslund
BY Herman L. Gordon
Attorney

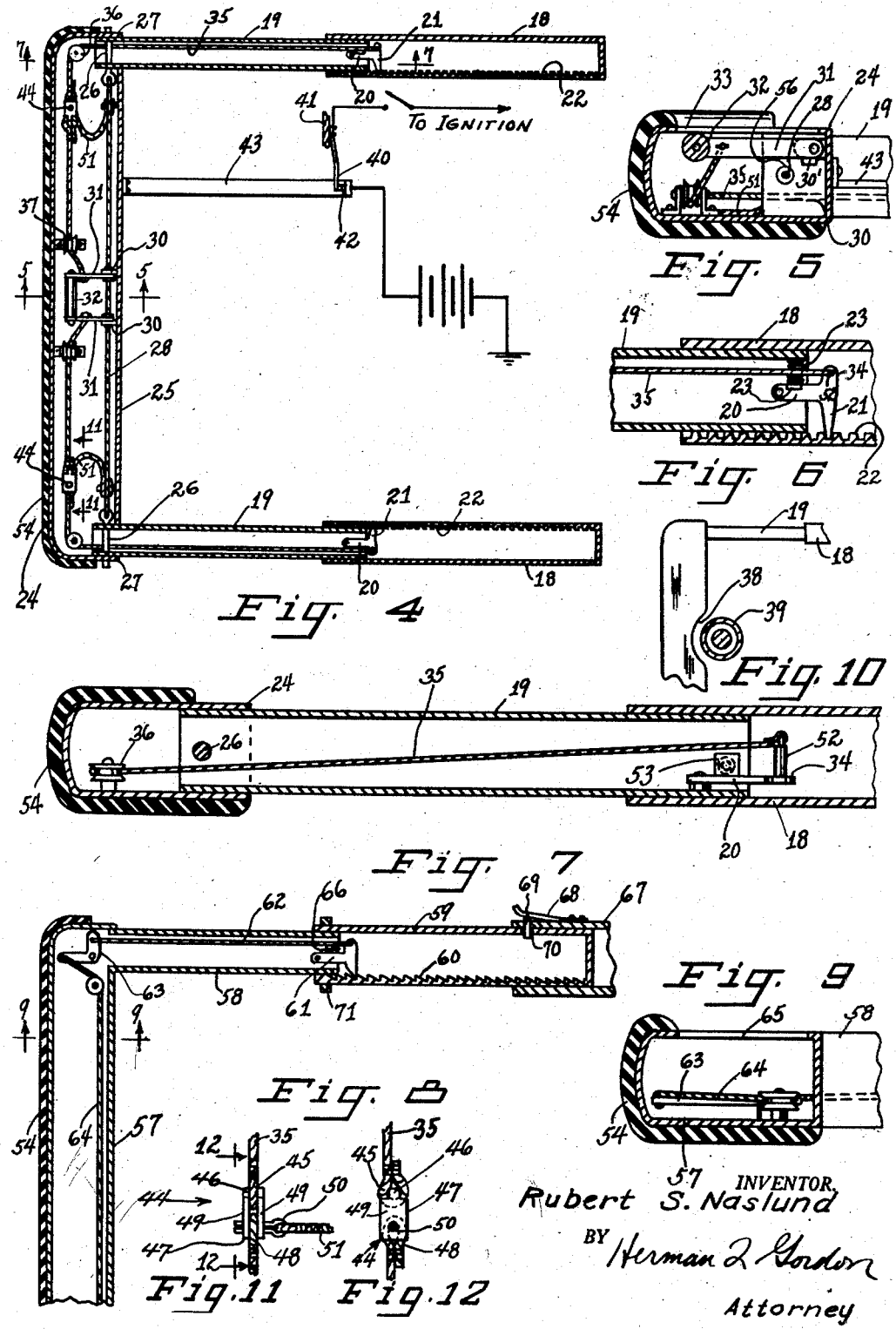

United States Patent Office 2,801,866
Patented Aug. 6, 1957

2,801,866

AUTOMOBILE SAFETY BAR DEVICE

Rubert S. Naslund, Des Plaines, Ill.

Application December 20, 1954, Serial No. 476,162

9 Claims. (Cl. 280—150)

This invention relates to automobile safety devices, and more particularly to automobile safety bars of the retractable type.

A main object of the invention is to provide a novel and improved retractable safety bar device for use in passenger vehicles, said device being simple in construction, being easy to install, and being arranged to protect the vehicle operator and passengers in the vehicle from injury due to sudden deceleration of the vehicle caused by sudden application of the brakes, collision, or other similar emergency, wherein the operator or passengers would be propelled forwardly in the vehicle by the momentum of the operator or passengers.

A further object of the invention is to provide an improved safety bar device for passenger automobiles, said device involving inexpensive components, being durable in construction, and being readily retractable to an out-of-the-way position when not in use.

A still further object of the invention is to provide an improved safety bar device for a passenger vehicle, said device being normally stowed in an out-of-the-way position but being readily extensible to an operative position to engage the bodies of passengers of the vehicle, said device being provided with readily accessible means for releasing the device for retracting same, and being further provided with means for immediately unfastening the main retaining member of the device from its supports in case of emergency, whereby the passengers may readily free themselves from the safety bar device so that they can leave the vehicle.

Further objects and advantages of the invention will become apparent from the following description and claims, and from the accompanying drawings, wherein:

Figure 4 is a horizontal cross-sectional view taken on line 4—4 of Figure 1.

Figure 5 is an enlarged cross-sectional detail view taken on line 5—5 of Figure 4.

Figure 6 is an enlarged cross-sectional detail view showing one of the pivoted latch elements employed in the safety bar device of Figure 4.

Figure 7 is an enlarged cross-sectional detail view taken on line 7—7 of Figure 4.

Figure 8 is a fragmentary cross-sectional view similar to Figure 4 but showing a modification of the present invention.

Figure 9 is an enlarged cross-sectional detail view taken on line 9—9 of Figure 8.

Figure 10 is a fragmentary horizontal cross-sectional view taken through the steering post of a passenger automobile provided with a safety bar device according to the present invention and illustrating a further modification of the safety bar device.

Figure 11 is an enlarged elevational detail view taken on line 11—11 of Figure 4.

Figure 12 is a detail view taken on line 12—12 of Figure 11.

Figure 1:
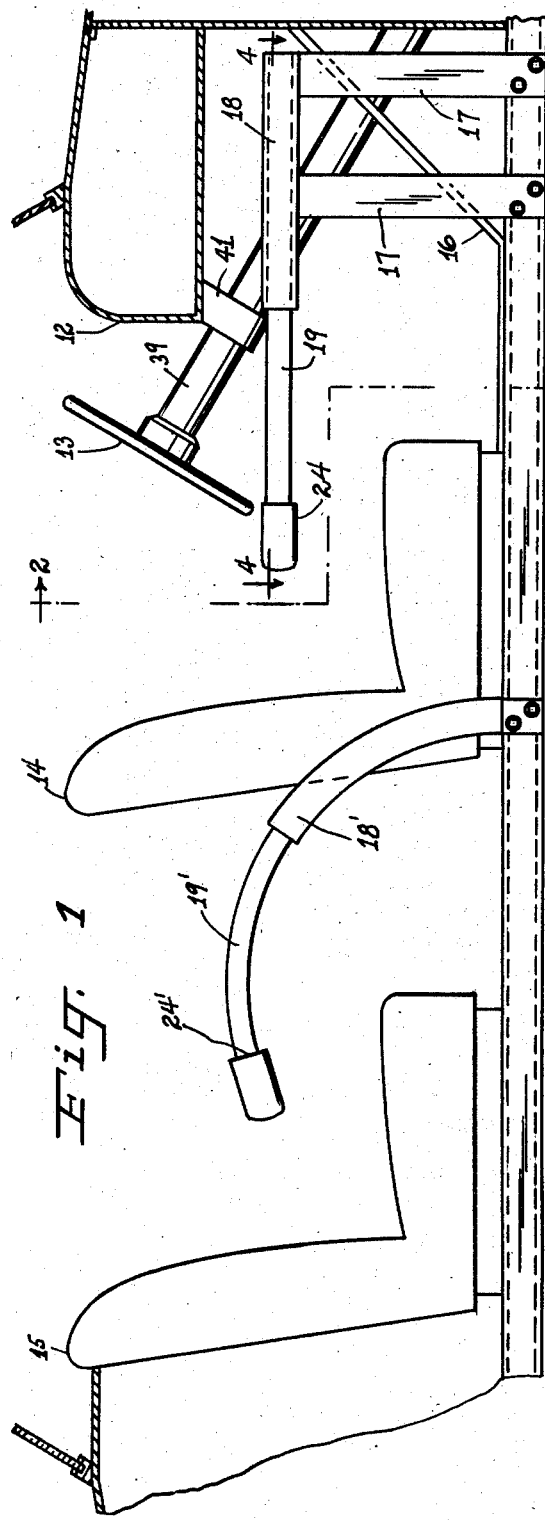
Figure 1 is a fragmentary side elevational view of an automobile passenger compartment, showing safety bar devices according to the present invention installed in the passenger compartment.
Figure 2:
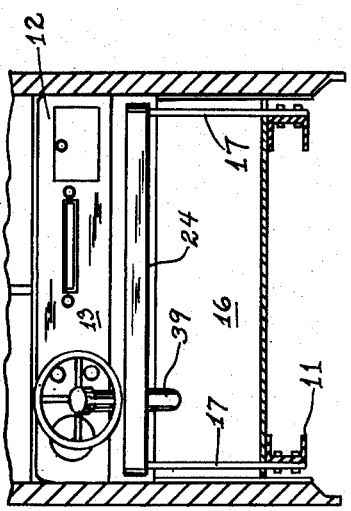
Figure 2 is a fragmentary transverse vertical cross-sectional view to a reduced scale, taken on line 2—2 of Figure 1.

Referring to the drawings, and more particularly to Figures 1, 2 and 4 to 6, 11 generally designates the frame of a conventional automobile having a passenger compartment provided with a dashboard 12, a steering wheel 13, a front seat 14, and a rear seat 15. Secured to the sides of the frame and extending vertically on opposite sides of the floorboard 16 are respective pairs of upstanding support bars 17, 17, and secured to the top ends of said support bars are respective parallel horizontal sleeve members 18, 18.

Designated at 19, 19 are respective tubular arms which are telescopically received in the sleeve members 18, 18. Pivoted in the forward end portions of the arms 19, 19 are respective pawl members 20 having transversely directed catch arms 21 which are lockingly engageable with ratchet teeth 22 formed longitudinally in the inside wall surfaces of the sleeve members 18, as shown in Figures 4 and 6. Locking springs 23 are suitably mounted between the pawl members 20 and the wall portions of the arms 19 opposite the teeth 22, biasing the catch elements 21 into locking engagement with said teeth.

Designated at 24 is a transverse hollow guard bar formed with apertures in the opposite ends of its inside wall 25, the rear end portions of the arms 19, 19 being slidably engaged through said apertures and being releasably connected to the guard bar by respective transverse pins 26, 26 which extend through the end portions of the respective arms 19, 19 and through the respective end walls 27, 27 of the guard bar 24. The inner ends of the pins are connected to the opposite ends of a flexible cable 28 extending longitudinally in the hollow guard bar.

The intermediate portion of the wall 25 has interiorly secured thereto respective spaced lugs 30, 30 to which are pivoted the respective lever arms 31, 31. Said lever arms are connected to a transverse common actuating handle 32 which is disposed below an aperture 33 formed in the top wall of guard bar 24, as shown in Figure 5. Arms 31 are supported on rib elements 30' on lugs 30.

Each pawl member 20 is formed with an apertured lug 34 opposite its catch element 21, as shown in Figure 6. The lugs 34 are connected to the respective lever arms 31 by respective flexible cables 35 extending through the tubular arms 19 and around pulleys 36 and 37 provided in the guard bar 24, as shown in Figure 4.

As will be readily apparent, when handle 32 is elevated through aperture 33, the levers 31 exert tension on the cables 35 and cause the pawl members 20 to be simultaneously rotated away from the ratchet teeth 22, thereby releasing the tubular arms 19 for telescopic movement in sleeves 18.

Normally, the guard bar 24 will be positioned substantially beneath the dashboard 12. To extend the guard bar to engage the bodies of persons occupying the front seat 14, the handle 32 is grasped and elevated, allowing the guard bar to be moved toward said persons, to a desired position of engagement with the bodies of the persons, after which the handle 32 is released, thus locking the guard bar in its desired operative position. The guard bar may be returned to its inoperative position beneath the dashboard by a reverse procedure.

As shown in Figure 10, the guard bar may be formed with a notch or recess 38 to provide clearance for the steering column, shown at 39, whereby the guard bar may be stowed more closely adjacent to the steering post.

A suitable flexible contact arm 40 may be mounted on the frame of the vehicle, for example, on the steering post bracket 41, and may be arranged so as to be engaged by a contact element 42 carried by a rigid arm 43 secured to the guard bar when the guard bar is in its extended position, as shown in Figure 4. The contacts 40 and 42 may be connected in series with the automobile ignition circuit, so that said circuit cannot be energized until the guard bar is extended to an operative position.

The portions of cables 35 inside the guard bar 24 include respective releasable couplings 44, whereby the cables are normally held together but may be disconnected in case of emergency. Thus, a loop 45 on the end of one segment of each cable portion is secured to the bight portion 46 of a U-shaped yoke 47. A loop 48 on the end of the other segment of the cable portion is received between the arms 49, 49 of the yoke 47 and is fastened therebetween by a cotter pin 50 extending through apertures in said arms 49, 49, the cotter pin being retained in said apertures by friction. A short length of flexible cable 51 connects each cotter pin 50 to the adjacent portion of the emergency release cable 28, so that when said emergency release cable is pulled, the cotter pins 50 are pulled simultaneously with the fastening pins 26, whereby the cables 35 are disconnected at the same time that the guard bar 24 is unfastened from the support arms 19, 19.

As shown in Figure 7, the cables 35 are connected to the top ends of upstanding pin members 52 secured on the lugs 34, said pin members being of substantial height so that the cables may properly clear the biasing springs 23. The pawl members 20 are provided with upstanding lugs 53 formed to define suitable bearings for the ends of said biasing springs 23.

The guard bar 24 is provided with an outer layer 54 of suitable padding material, such as sponge rubber or the like.

As shown in Figure 5, the emergency release cable 28 extends through apertures 56 formed in the lugs 30, the portion of cable 28 between the lugs 30 being accessible through the aperture 33.

As shown in Figure 1, the rear portion of the passenger compartment is also provided with a safety bar device, comprising a hollow transverse guard bar 24' secured at its ends on parallel arcuate tubular supports 19', 19' which are telescopically received in respective arcuate sleeve members 18' secured to the side members of the automobile frame 11 on opposite sides of the front seat 14. The sleeve members are provided with internal ratchet teeth similar to the ratchet teeth 22, and pawl members 20 are pivoted in the end portions of the arcuate supports 19', said pawl members being lockingly engageable with said ratchet teeth by means similar to that provided for the pawl members of the front seat guard device. The control cables for the pawl members of the arcuate tubular supports 19' extend over guide pulleys 55 provided at spaced points in the arcuate tubular supports, as shown, for example, in Figure 3.

Figure 3:
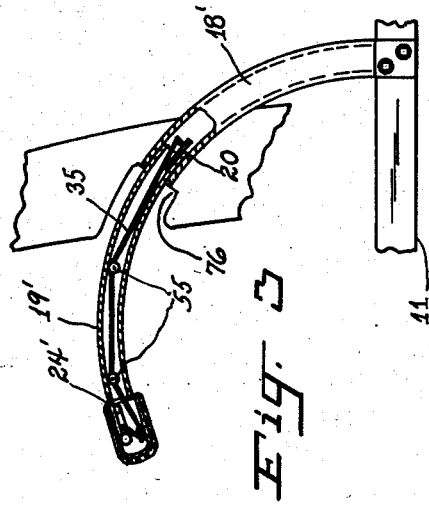
Figure 3 is a fragmentary side elevational view, partly in cross-section, of a rear passenger safety bar assembly according to the present invention, showing a modification including a recess in the back of the front seat of the automobile shaped to receive the main retaining member of the safety bar assembly.

To facilitate convenient stowage of the rear guard bar 24', the sleeve members 18' may be located somewhat forwardly of their locations of Figure 1, and the front seat may be provided with a channel or groove 76 shaped to receive the guard bar 24', as shown in Figure 3.

The rear seat safety device may be provided with an emergency release means for disconnecting the control cables and for unfastening the guard bar 24' from its supports 19', similar to the emergency release means provided for the front seat safety device, and described above.

In the modification illustrated in Figures 8 and 9, the side supports for the hollow guard bar, shown at 57, comprise respective tubular members 58 rigidly secured to the ends of said guard bar. The members 58 are telescopically received in respective sleeve members 59 formed internally with ratchet teeth 60 which are lockingly engageable by respective pawl members 61 pivoted in the ends of members 58. Each pawl member 61 is connected by a cable 62 to one arm of a bell crank lever 63 pivoted in the associated end of the guard bar 57, the other arm of the bell crank lever being connected to an end of the control cable 64, which extends beneath a central aperture 65 formed in the top wall of the guard bar 57. The pawl members 61 may be rotated against the force of their biasing springs 66 to released positions by pulling upwardly on the portion of control cable 64 located below the aperture 65.

As further shown in Figure 7, the side supports may comprise additional sleeve members 67 secured to the vehicle frame and telescopically receiving the respective sleeve members 59. Resilient spring catches 68 are provided on the end portions of the sleeve members 67, said spring catches having locking pins 69 which are receivable in apertures 70 in the forward end portions of the sleeve members 59. By flexing the spring catches 68 outwardly, the pins 69 may be retracted sufficiently to allow the sleeve members 59 to be telescoped inside the sleeve members 67. Abutment collars 71 are provided on the rear end portions of the sleeve members 59, said collars being engageable against the rims of the sleeve members 67 to limit inward telescopic movement of the sleeve members 59. Fine adjustment of the guard bar 57 is provided by the cooperative engagement of the pawl members 61 with the ratchet teeth 60.

By the provision of multiple telescopic sleeves for the side supports of the guard bar, as shown in Figure 7, the total length of the side supports in the retracted position of the device may be substantially shortened.

While certain specific embodiments of retractible automobile safety bar devices have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a motor vehicle having a frame and a passenger seat, a safety device comprising a pair of sleeve-like supports secured to said frame adjacent opposite sides of said seat, respective arms telescopically engaged with said sleeve-like supports, respective locking elements pivoted to said arms and being lockingly engageable with said supports, a hollow guard bar engaged on the ends of said arms, respective pins extending through said arms and adjacent portions of said guard bar and detachably securing said guard bar to said supports, common control means connected to said locking elements and extending through said guard bar, means whereby said locking elements may be simultaneously moved to unlocking positions by actuating said common control means, and means for at times detaching said pins, said detaching means comprising a flexible cable connected at its opposite ends to said pins and extending through said hollow guard bar, the intermediate portion of said cable being located adjacent said common control means.

2. A safety bar device for a motor vehicle comprising a pair of sleeve members adapted to be secured in parallel relation on opposite sides of an automobile seat, ratchet teeth in said sleeve members, respective tubular arms slidably engaged in said sleeve members, respective pawl members pivoted in the end portions of said tubular arms and projecting outwardly therefrom sufficiently to engage said ratchet teeth, spring means in said arms biasing said pawl members into locking engagement with said teeth, a hollow guard bar secured transversely to said arms, a U-shaped operating handle pivotally mounted in said guard bar for rotation on an axis parallel to said guard bar, and cable means connected between the respective arms of said handle and said pawl members and arranged to simultaneously rotate said pawl members to unlocking positions responsive to rotation of said handle.

3. A safety bar device for a motor vehicle comprising a pair of sleeve members adapted to be secured in parallel relation on opposite sides of an automobile seat, ratchet teeth in said sleeve members, respective tubular arms slidably engaged in said sleeve members, respective pawl members pivoted in the end portions of said tubular arms and projecting outwardly therefrom sufficiently to engage said ratchet teeth, spring means in said arms biasing said pawl members into locking engagement with said teeth, a hollow guard bar secured transversely to said arms, a U-shaped operating handle pivotally mounted in said guard bar for rotation on an axis parallel to said guard bar, said guard bar being formed with an aperture adjacent said handle of sufficient size to allow access to said handle and for rotating same, and cable means connected between the respective arms of said handle and said pawl members and arranged to simultaneously rotate said pawl members responsive to rotation of said handle.

4. A safety bar device for a motor vehicle comprising a pair of sleeve members adapted to be secured in parallel relation on opposite sides of an automobile seat, ratchet teeth in said sleeve members, respective tubular arms slidably engaged in said sleeve members, respective pawl members pivoted in the end portions of said tubular arms and projecting outwardly therefrom sufficiently to engage said ratchet teeth, spring means biasing said pawl members into locking engagement with said teeth, a hollow guard bar having respective apertures in its end portions receiving said arms, respective outwardly directed fastening pins extending through said arms and the respective end walls of the guard bar, first cable means extending through the guard bar and connecting the inner ends of said fastening pins, and second cable means extending through said guard bar and connected to the respective pawl members so that the pawl members will be simultaneously rotated to unlocking positions responsive to tension in said second cable means, said guard bar being formed with an aperture of sufficient size to allow access to both said cable means.

5. A safety bar device for a motor vehicle comprising a pair of sleeve members adapted to be secured in parallel relation on opposite sides of an automobile seat, ratchet teeth in said sleeve members, respective tubular arms slidably engaged in said sleeve members, respective pawl members pivoted in the end portions of said tubular arms and projecting outwardly therefrom sufficiently to engage said ratchet teeth, spring means biasing said pawl members into locking engagement with said teeth, a hollow guard bar having respective apertures in its end portions receiving said arms, respective outwardly directed fastening pins extending through said arms and the respective end walls of the guard bar, first cable means extending through the guard bar and connecting the inner ends of said fastening pins, a handle pivoted in said guard bar, respective cables connecting said handle to the respective pawl members and arranged to simultaneously rotate said pawl members to unlocking positions, respective releasable couplings in said last-named cables, and means operatively connecting said couplings to said first cable means and being arranged to unfasten said couplings simultaneously with the withdrawal of said fastening pins when tension is exerted on said first cable means, said guard bar being formed with an aperture of sufficient size to allow access to said handle and said first cable means.

6. In a motor vehicle having a frame, a front passenger seat and a rear passenger seat, a safety device comprising a pair of supports secured in parallel relation adjacent opposite sides of said front seat, a pair of arms slidably secured to said supports and extending rearwardly of said front seat, a transverse guard bar connected to the ends of said arms, the back of the front passenger seat being formed with a horizontal recess of sufficient depth to receive said guard bar therein and located to receive said guard bar when said arms are moved forwardly relative to said supports, and cooperating locking means on the respective arms and supports arranged to lock the arms in adjusted positions relative to said supports.

7. In a motor vehicle having a frame, a front passenger seat and a rear passenger seat, a safety device comprising a pair of supports secured in parallel relation adjacent opposite sides of said front seat, a pair of arms slidably secured to said supports and extending rearwardly of said front seat, a transverse guard bar connected to the ends of said arms, the back of the front passenger seat being formed with a horizontal recess of sufficient depth to receive said guard bar therein and located to receive said guard bar when said arms are moved forwardly relative to said supports, cooperating locking means on the respective arms and supports arranged to lock the arms in adjusted positions relative to said supports, and common control means on the guard bar connected to the locking means and arranged to simultaneously release said locking means.

8. In a motor vehicle having a frame, a front passenger seat and a rear passenger seat, a safety device comprising a pair of downwardly and forwardly extending arcuate supports secured in parallel relation adjacent opposite side edges of the back of said front seat, a pair of arcuate arms of common radius with and slidably engaged with said supports and extending rearwardly of said front seat, a transverse guard bar connected to the ends of said arms, the back of the front passenger seat being formed with a horizontal recess of sufficient depth to receive said guard bar therein and located to receive said guard bar when said arms are moved forwardly relative to said supports, and cooperating locking means on the respective arms and supports arranged to lock the arms in adjusted positions relative to said supports.

9. In a motor vehicle having a frame, a front passenger seat and a rear passenger seat, a safety device comprising a pair of downwardly and forwardly extending arcuate supports secured in parallel relation adjacent opposite side edges of the back of said front seat, a pair of arcuate arms of common radius with and slidably engaged with said supports and extending rearwardly of said front seat, a transverse guard bar connected to the ends of said arms, the back of the front passenger seat being formed with a horizontal recess of sufficient depth to receive said guard bar therein and located to receive said guard bar when said arms are moved forwardly relative to said supports, cooperating locking means on the respective arms and supports arranged to lock the arms in adjusted positions relative to said supports, and common control means on the guard bar connected to the locking means and arranged to simultaneously release said locking means.

References Cited in the file of this patent

UNITED STATES PATENTS

| | | |
|---|---|---|
| 1,137,519 | Newburger | Apr. 27, 1915 |
| 2,322,755 | Voorhies | June 29, 1943 |
| 2,654,616 | Mockli | Oct. 6, 1953 |
| 2,749,143 | Chika | June 5, 1956 |

FOREIGN PATENTS

| | | |
|---|---|---|
| 582,985 | France | Oct. 24, 1924 |
| 880,862 | Germany | June 25, 1953 |